United States Patent [19]
Harm et al.

[11] Patent Number: 5,051,880
[45] Date of Patent: Sep. 24, 1991

[54] MIXED MODE REGULATION CONTROLLER FOR A RESONANT POWER CONVERTER

[75] Inventors: Charles E. Harm, Dallas; Kenneth J. Timm, Rockwall, both of Tex.

[73] Assignee: AT&T Bell Laboratories, Murray Hill, N.J.

[21] Appl. No.: 459,038

[22] Filed: Dec. 29, 1989

[51] Int. Cl.⁵ .......................................... H02M 7/517
[52] U.S. Cl. ....................................... 363/49; 363/97
[58] Field of Search ...................... 363/17, 26, 97, 98, 363/132, 134, 49

[56] References Cited

U.S. PATENT DOCUMENTS

| | | | |
|---|---|---|---|
| 3,909,695 | 9/1975 | Peck | 363/25 |
| 4,333,135 | 6/1982 | Schwarz | 363/28 |
| 4,459,651 | 7/1984 | Fenter | 363/21 |
| 4,525,774 | 6/1985 | Kino et al. | 363/17 |
| 4,535,399 | 8/1985 | Szepesi | 363/134 |
| 4,541,041 | 9/1985 | Park et al. | 363/132 |
| 4,600,823 | 7/1986 | Hiejima | 219/10.77 |
| 4,700,285 | 10/1987 | Szepesi | 363/97 |
| 4,712,170 | 12/1987 | Grace | 363/98 |

Primary Examiner—Steven L. Stephan
Assistant Examiner—Jeffrey Sterrett
Attorney, Agent, or Firm—A. G. Steinmetz

[57] ABSTRACT

Frequency variation in a resonant zero voltage switching (ZVS) power converter is combined with supplemental duty cycle modulation to obtain voltage regulation and to narrow the required frequency band needed for regulation of a given output load. These two regulation processes are applied simultaneously to the power switch control in order to accommodate a wider range of regulated load. Hence in the alternative, for a given load range a smaller frequency range is needed than would be the case if frequency variation alone is used.

The regulation control circuit includes both a duty cycle modulator and a frequency modulator each being responsive to an error signal responsive to a differential between an output voltage of the converter and a reference voltage. Each individual modulator has its own transfer function; one transfer function being kHz/volt the other transfer function being % duty cycle/volt. The regulation control circuit output is a rectangular pulse type signal that contains both elements of frequency modulation and duty cycle modulation.

3 Claims, 4 Drawing Sheets

MIXED MODE REGULATION CONTROLLER FOR A RESONANT POWER CONVERTER

FIELD OF THE INVENTION

This invention relates to a resonant switching mode power converter and in particular to a regulation controller for a resonant power converter.

BACKGROUND OF THE INVENTION

Resonant power converters are uniquely suited for applications requiring a power supply with high power density. High power density is achievable in a resonant power converter because the cyclic energy storage components of the power supply for a given power capability can be significantly smaller at very high frequencies.

Resonant converters operate by utilizing a series tuned reactive circuit as a reactive divider in combination with a load network. The output load voltage is inversely proportional to the switching frequency. Frequency of switching is always above a minimum threshold so that the series tuned network is an inductive impedance. If the load decreases in value and the input line voltage increases the frequency of operation is increased to increase the reactive division ratio to maintain regulation of the output voltage. As the load decreases further the frequency increases to a value at which high component losses result in a considerable loss in efficiency in the converter.

The need to restrain the range of frequency variation limits the load range that can be accepted, if operational efficiency is to be maintained. This limitation of acceptable load range is particularly aggravated when the load demands a wide range of output currents.

SUMMARY OF THE INVENTION

Frequency modulation is simultaneously combined with duty cycle modulation in a resonant power converter to narrow the required frequency band needed for regulation within a given range of output load. These two regulation processes are simultaneously combined and a combination regulation signal is applied to the power switch control. For a given load range ratio Rl max/RL min a smaller frequency variation range fmax/fmin is needed when duty cycle modulation is simultaneously combined with frequency modulation as compared with using frequency modulation alone.

In a specific embodiment the regulation control circuit includes both a duty cycle modulator and a frequency modulator each being responsive to an error signal responsive to a differential between an output voltage of the converter and a reference voltage. Each individual modulator has its own transfer function; one transfer function being kHz/volt the other transfer function being % duty cycle/volt. The regulation control circuit output, which in the illustrative embodiment is taken from the duty cycle modulator, is a rectangular pulse type signal that contains both elements of frequency modulation and duty cycle modulation.

DETAILED DESCRIPTION

Figure 1:
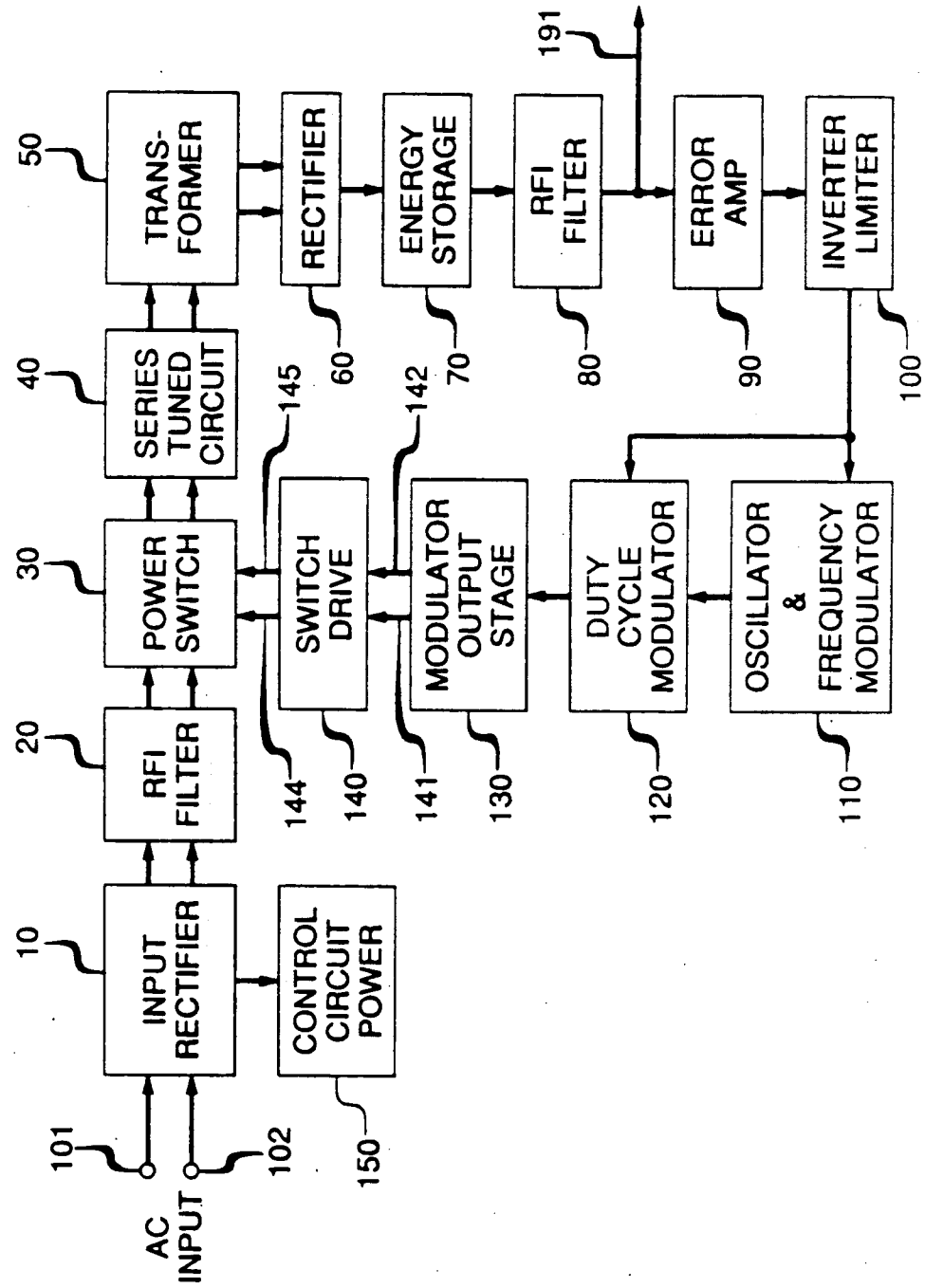
FIG. 1 is a block schematic of a resonant power converter embodying the principles of the invention.

A resonant power converter embodying the principles of the invention is shown in FIG. 1. AC line power is applied to the inputs terminals 101 and 102. A full wave rectifier 10 rectifies the input AC voltage and a subsequent filter circuit 20 is included for preventing transmission of high frequency signals either into or out of the converter. The DC voltage output of filter circuit 20 is applied to a power switching circuit 30. Power switching circuit 30 is coupled to a series tuned circuit 40 having a substantially solely reactive impedance and tuned to be inductive within the operating frequency range of the converter. Its primary function is to transfer engery chopped by the power switching circuit 30 to a transformer 50 at a single frequency. The output of the series tuned circuit 40 is applied to a transformer 50 included in the converter to provide galvanic isolation between the input and output of the converter. A rectifier 60, coupled to receive the output of transformer 50, charges an energy storage capacitor 70 to a regulated DC voltage. This DC voltage is coupled via a filter circuit 80 to the output terminal 191 of the converter to which a load to be energized is connected.

A regulation control for the converter includes an error amplifier 90, which is connected to the output terminal 191, generates an error signal responsive to a deviation of the voltage at output terminal 191 from its desired regulated value. It generates an error voltage which is applied to an inverter limiter circuit 100. The inverter limiter circuit 100 defines upper and lower boundaries to establish boundary operational conditions for the operation of the frequency modulator 110 and the duty cycle modulator 120, to which the output of the inverter limiter circuit 100 is simultaneously directed.

The frequency modulator 110 and the duty cycle modulator 120 each have a specific transfer function operative in response to the error voltage output of the error amplifier 90 as applied, via the inverter limiter circuit 100. The frequency modulator 110 responds directly to the error voltage output of the inverter limiter circuit 100 and produces an error voltage to signal frequency transformation. The subsequent duty cycle modulator 120 also responds to the error output at the inverter limiter circuit and applies an error voltage to duty cycle transformation to the frequency modulated output signal of the frequency modulator 110.

The combined frequency modulated and duty cycle modulated control signal at the output of the duty cycle modulator 120 is applied to a modulator output stage 130 which provides two duty cycle and frequency modulated output pulse trains of opposite phase on leads 141 and 142 to the switch drive circuitry 140. The switch drive circuitry 140 provides the drive signals on leads 144 and 145 to control the conductivity of two alternately switched power switches in the power switching circuit 30.

Figure 2:
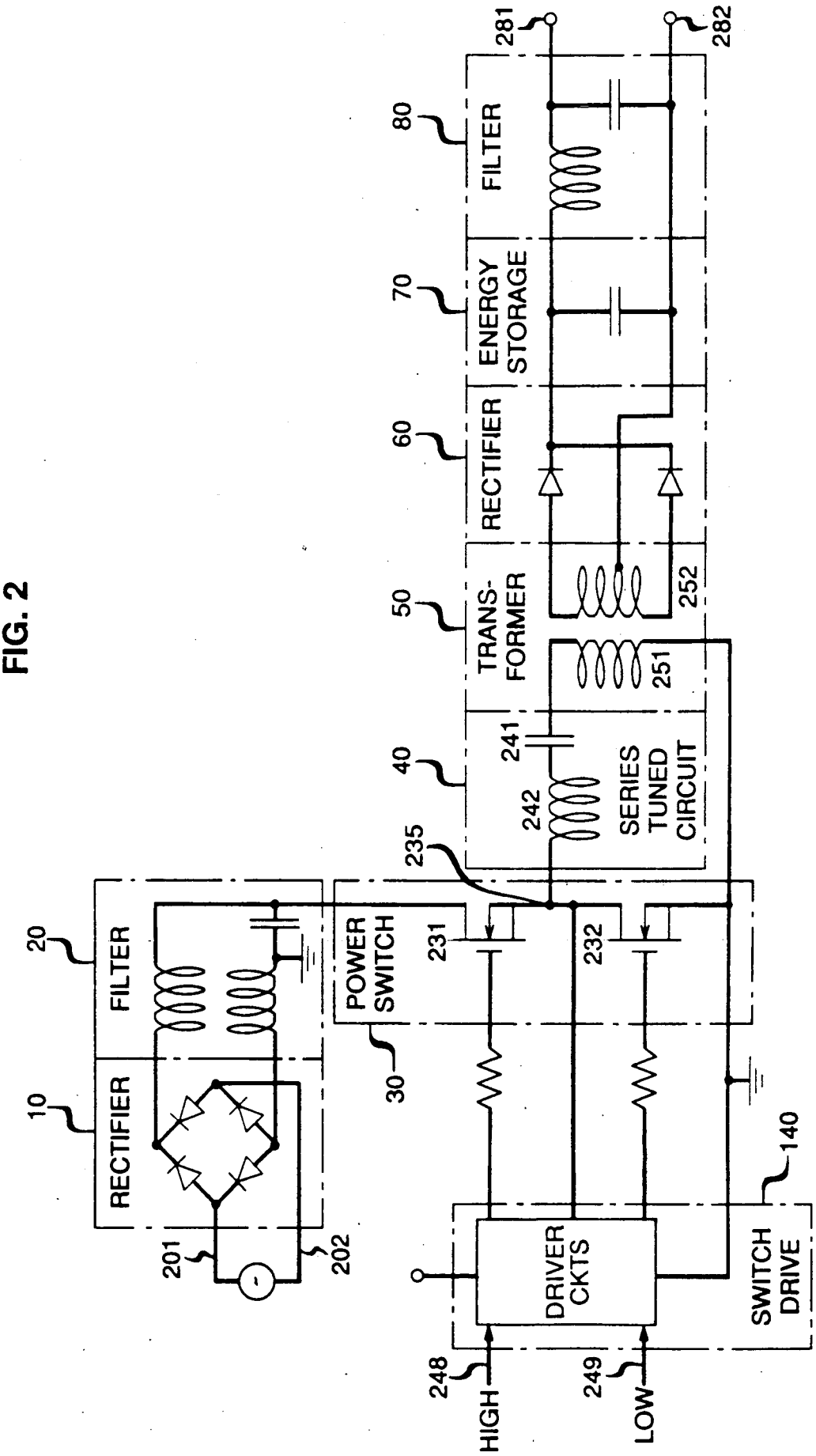
FIG. 2 is a circuit schematic of the power train of the resonant power converter of FIG. 1.

A circuit schematic of the power train of the converter is shown in FIG. 2. A source of AC voltage is coupled to a full wave rectifier 10, via the inputs leads 201 and 202. Its rectified output is coupled, via a filter circuit 20, to the power switch circuit 30 which circuit includes first and second MOSFET power switching devices 231 and 232. These switching devices are connected in a half bridge configuration. The bridge capacitors are included in the switch drive 140. The signal output at node 235 is applied to a series tuned circuit 40 comprising the capacitor 241 and the inductor 242. The series tuned circuit 40 is operated above resonance and hence appears to be slightly inductive to a degree dependent on the operating frequency value within the operating frequency range of the power converter. This series tuned circuit 40 transmits power to the primary winding 251 of a transformer 50 at a single frequency. It is also operative to control the discharging of the parasitic capacitances of the power MOSFET power switching devices with a minimum of power dissipation in these power switching devices. The output of the secondary winding 252 of transformer 50 is rectified in rectifier 60 and stored on a voltage storage capacitor 70. Power flow to the output terminals 281 and 282 is via the output RFI filter 80.

Figure 3:
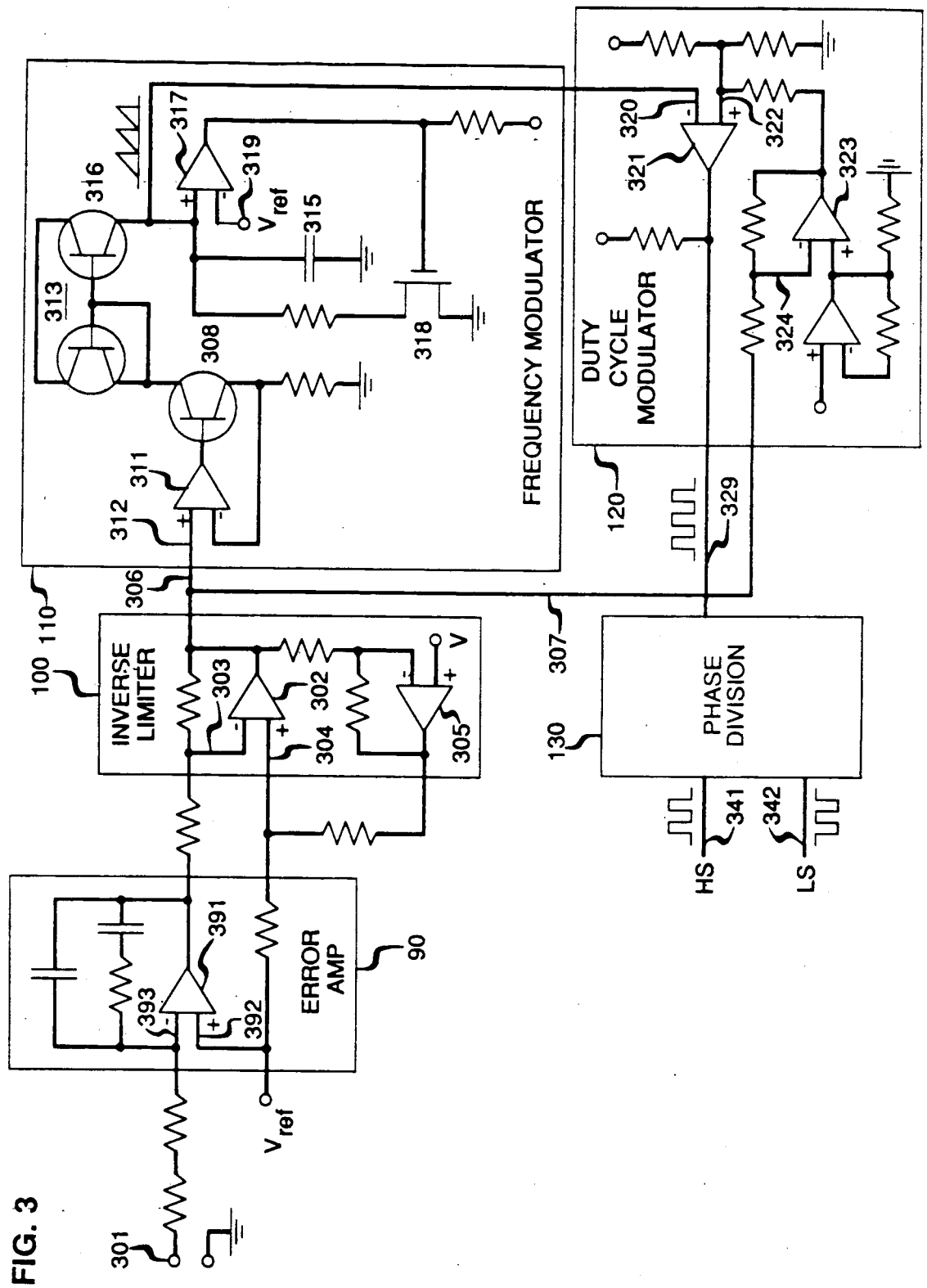
FIG. 3 is a circuit schematic of the regulation control circuitry of the resonant power converter of FIG. 1.

Switch drive to the MOSFET power switching devices 231 and 232 is supplied by the drive circuit 140 which is responsive to the high and low drive signals supplied at leads 248 and 249. The source of these high and low drive signals is the control circuit shown in FIG. 3. A signal proportional to the output voltage of the power train across leads 281 and 282 is applied to the input terminal 301 and applied to the error amplifier 90. Error amplifier 90 includes a op amp 391 having sufficient loop gain and frequency compensation to insure that the control circuit loop is operationally stable for the expected range of line and load conditions. The loop gain and bandwidth is great enough so that the regulation control may respond rapidly and accurately to transient line and load changes. A voltage reference is applied to the non inverting input 392 of amplifier 391 and the voltage proportional to the output voltage is applied to inverting input 393.

The error signal output of the error amplifier 90 is applied to the inverting input 303 of an operational amplifier 302 included in the inverter limiter 100. The inverter limiter 100 is operative to control an operational range at the converter and assure optimum control at start up of the power converter. Since the reference voltages typically achieve a normal value before the output voltage of the converter has attained a value within its desired operating range, the output of the error amplifier is initially at very high voltage. This high error voltage would result in the regulation control initially driving the coverter at a high frequency and a very low duty cycle, at start up, thereby delaying attainment at a regular output. For start up the best combination is a low conveyor frequency just above the resonant frequency of the series tuned circuit with a duty cycle of 50%. This combination permits the converter to achieve an operating line and load range most rapidly. The inverter limiter circuit 100 assures this desired operational condition by inverting the output of the error amplifier 90 and hence a low frequency high duty cycle is assured at start up of the power converter.

Figure 4:
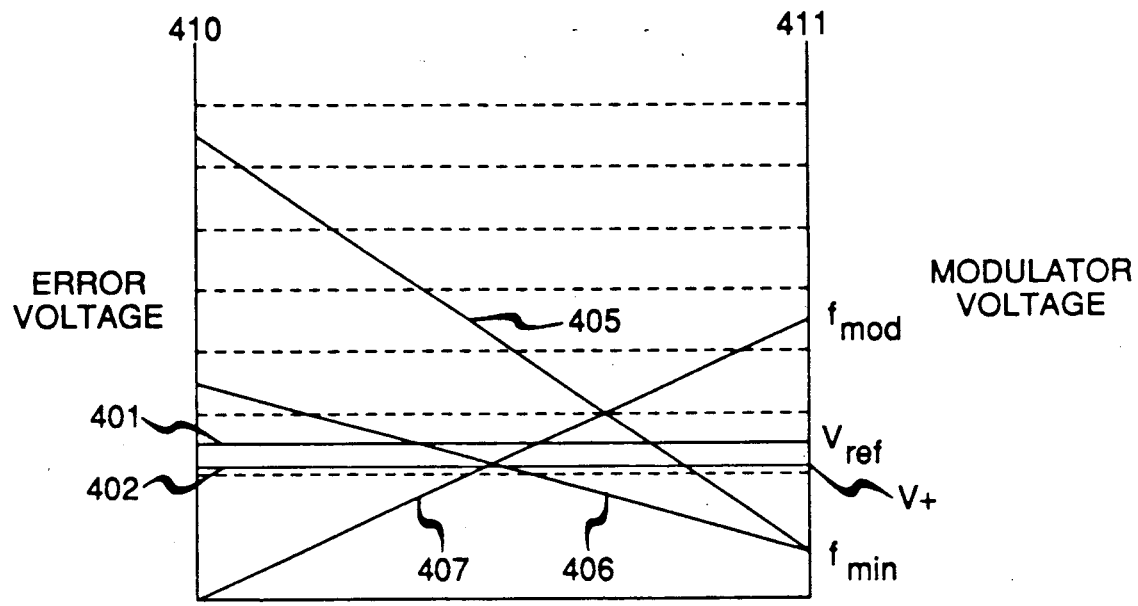
FIG. 4 is a graph illustrating operating characteristics of the regulation control circuit of FIG. 3.

The effect of the inverter limiter circuit 100 is made readily apparent by referring to the diagram of FIG. 4. Horizontal line 401 represents the reference voltage applied to the error amplifier 90. Horizontal line 402 represents this reference voltage as drooped by resistance 404 and applied to the non inverting input 304 of operational amplifier 302. Line 405 defines how a high error voltage output of the error amplifier on vertical axis 410 equates to a modulation control voltage producing a minimum operational frequency on vertical axis 411. Line 406 equates even a lesser error voltage to the same miniumum frequency of operation. Within the range of error voltages defined by the intersections of lines 405 and 406 with the error voltage axis 410 the operational amplifier 305 functions as a feedback amplifier which boosts the voltage level applied to the non inverting input 304 of the operational amplifier 302 and maintains its output sufficiently high at substantially a fixed value to assure at least a minimum converter operating frequency and a 50% duty cycle of operation. Below the error voltage at which the line 406 intersects the error voltage axis 410, the output of operational amplifier 305 bottoms out and its feedback action is terminated. Any further decrease in the error voltage is accompanied by a corresponding change in the voltage applied by the inverter limiter 100 to the frequency modulator 110 and the duty cycle modulator 120. Connecting line 407 illustrates how a low error voltage results in effecting the maximum operating frequency of the converter.

Figure 5:
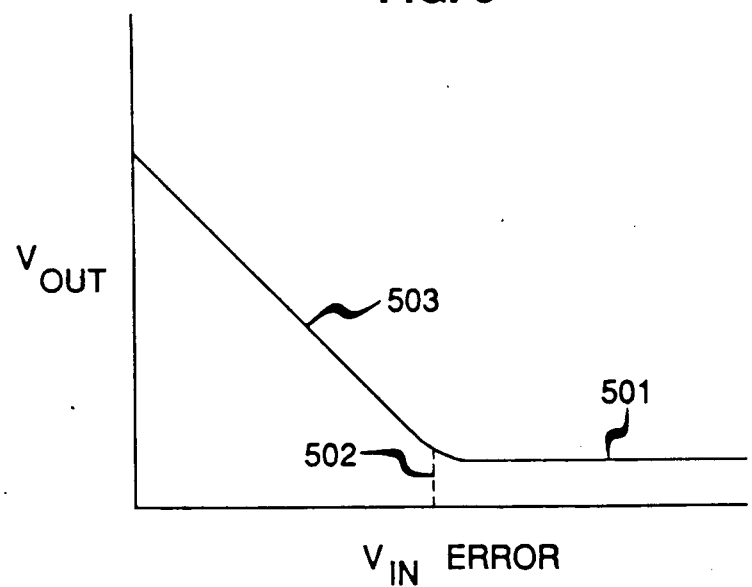
FIG. 5 is a graph illustrating transfer characteristics of the invention limiting circuit shown in FIG. 3.

The operation of the inverter limiter 100 may be readily appraised by reference to the graph of FIG. 5 which defines its transfer function. As shown, at high error voltage inputs the output voltage is substantially constant at a voltage level 501. As the error voltage input descends to a threshold value 502 the output voltage of the limiter inverter 100 linearly rises with a decreasing error voltage as shown by the rising voltage slope 503.

The output of the inverter limiter 100 is applied to the frequency modulator 110 via lead 306, and to the duty cycle modulator 120 via lead 307. The frequency modulator 110 includes an operational amplifier 311 operative as a voltage follower and having its non inverting input 312 connected to lead 306 to receive the output of the inverter limiter 100. Its output is connected to a transistor 308 which drives a current mirror circuit 313 operative as a voltage controlled current source and having its output transistor 316 connected to supply a charging current to a capacitor 315. The rate at which capacitor 315 charges is hence dependent on the output voltage level of the inverter limiter circuit 100. Since the current mirror provides a substantially constant charging current the voltage of capacitor 315 increases linearly during charging.

The voltage of capacitor 315 is applied to the non inverting input 316 of the operational amplifier 317 whose output in turn controls the conductivity of a discharge path control transistor 318 which is connected in order to discharge capacitor 315. The voltage of the capacitor 315 is compared by operational amplifier comparator 317 with a reference voltage applied to its inverting input 319 and upon attainment of that reference voltage the output of amplifier 317 biases transistor 318 into conduction thereby discharging capacitor 315. The recovery time of amplifier 317 is sufficient to assure that capacitor 315 is fully discharged. As soon as the transistor is again biased non conducting, the capacitor 315 begins charging again. The rate of charging of capacitor 315 established by the error voltage level determines the frequency of switching of the power converter.

The output of the frequency modulator is a sawtooth signal whose frequency is determined by the output voltage level of the inverter limiter. This sawtooth waveform is the operative clock signal controlling the converter frequency. It is applied to the inverting input of an operational amplifier 321 of the duty cycle modulator 120. Amplifier 321 compares the sawtooth waveform with a reference voltage responsive to the output voltage of the inverter limiter circuit which is applied to its non inverting input 322.

The output of voltage limiter 100 is applied to the inverting input 324 of operational amplifier 323 whose output controls the level of the reference voltage applied to the non inverting input 322 of operational amplifier 321. Hence, as the reference voltage changes in response to the output of the inverter limiter circuit 100 the duty cycle of the output of the duty cycle modulator 120 changes with the duty cycle modulated signal operative at the frequency established by the frequency modulator 110.

The resulting combined frequency and duty cycle modulated signal at the output lead 329 of the duty cycle modulator 120 is applied to the modulator output stage 130. The modulator output stage 130 contains two parallel signal processing paths designated a high side drive path 331 and a low side drive path 332. Oppositely phased drive signals designated high side and low side drive signals appear on the leads 341 and 342 respectively. These two drive signals are applied to a power switch drive circuit such as is shown by the switch drive circuit in FIG. 2 which drives the alternately switched power switching devices of the power converter.

We claim:

1. A resonant power converter, comprising:
    a power switching circuit interconnecting an input to an output,
    control circuitry for regulating an output of the power switching circuit by controlling switching in the power switching circuit, including;
    an error signal generator for establishing a desired output signal level and generating an error signal proportionate to a difference between an actual output signal level and the desired output signal level;
    a frequency generator responsive to the error signal for generating a frequency signal whose frequency is responsive to the error signal;
    a duty cycle generator responsive to the error signal and to the frequency signal for generating a duty cycle modulated pulse signal whose frequency is established by the frequency signal with the duty cycle pulse signal generated at the frequency established and controlled in response to the error signal;
    drive circuitry for driving the power switching circuitry in response to the duty cycle modulated signal;
    error boundary limit circuitry for inverting the error signal applied to the frequency generator and the duty cycle generator with defined limits, at start up of the resonant power converter and including;
    an amplifier circuit responsive to the error signal generator to produce an inverted error signal, and
    a feedback circuit operative for retaining the inverted error signal output of the amplifier within specified limits.

2. A resonant power converter, comprising:
    an input and an output;
    a power switch for coupling energy between the input and the output;
    a sensing circuit for quantifying a deviation of a voltage at the output from a regulation value and generating an error signal;
    drive circuitry for driving the power switch, including;
    a frequency modulator generating a periodic waveform responsive to the error signal of the sensing circuit;
    a duty cycle modulator responsive to the error signal of the sensing circuit to generate a signal level and to the periodic waveform of the frequency modulator;
    means for combining the outputs of the frequency modulator and the duty cycle modulator to generate a power switch drive signal which is simultaneously frequency and duty cycle modulated by adjusting the signal level relative to the periodic waveform, and
    control circuitry for establishing a frequency of operation and a specified duty cycle at start up of the resonant power converter including a limiter circuit operative for inverting the error signal output of the sensing circuit.

3. A resonant power converter as claimed in claim 2, and further including:
    circuitry for dividing a switch drive signal into two signals of opposite polarity.

* * * * *